Dec. 24, 1968

N. W. FELDMAN 3,418,561

SOLID-STATE FILTER CIRCUIT

Filed Jan. 6, 1967

INVENTOR,
NATHAN W. FELDMAN.

BY Harry M. Saragovitz,
Edward J. Kelly, Herbert Berl
& Julian C. Keppler

ATTORNEYS

United States Patent Office 3,418,561
Patented Dec. 24, 1968

3,418,561
SOLID-STATE FILTER CIRCUIT

Nathan W. Feldman, Elberon, N.J., assignor to the United States of America as represented by the Secretary of the Army Filed Jan. 6, 1967, Ser. No. 607,863
4 Claims. (Cl. 323—22)

ABSTRACT OF THE DISCLOSURE

This invention relates to alternating current, choke circuits and particularly to noninductive, alternating current, choke circuits. More particularly this invention relates to a circuit that presents a high resistance to alternating current and a low resistance to direct current to use as an electrical closure for telephone circuitry.

Figure 1:
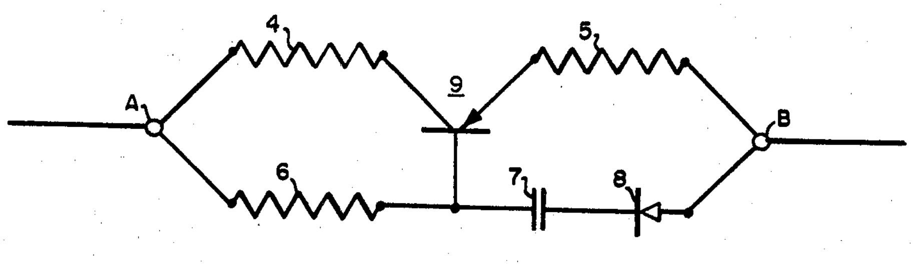

This invention is achieved by connecting a transistor across the terminals of a two terminal network in such a manner that the transistor appears as a common emitter circuit to the D-C potential across the two terminal network and as a common base connection to the A-C potentials across the two terminal network. Resistive loads are provided between the collector electrode and one terminal; between the base electrode and the one terminal; and between the emitter electrode and the other terminal of the two terminal network. A capacitor and a diode in series are connected between the base electrode and the other terminal of the two terminal network.

In the prior art of high impedance, A-C circuits, the simplest example is the inductive choke. This provides a relatively low, direct current resistance and a relatively high, alternating current impedance. However, the common inductive choke is inherently heavy and cumbersome. It uses considerable wire and space for its electrical conductor windings, and it often requires even more space for its magnetic paths. It is not compatible with microminature circuitry; which is of ever-increasing importance in modern communication equipment. The inductive characteristics of a choke, change the phase angle of a signal and interact with other electrical components to change the reactive characteristics of a circuit. A choke will also influence, and be influenced by, nearby magnetic elements.

There are other circuits that function as inductances or produce electrical effects similar to those of an inductance. Some of these circuits use tubes or transistors, usually more than one, and almost all of them have a reactive component that produces a phase shift or otherwise modifies passing signals. They may or may not provide a high enough alternating current impedance and they may or may not have a low enough direct current resistance for certain uses.

One solution to the low D-C, high A-C resistance characteristic problem is through the use of a transistor which has low resistance in its common emitter connection and relatively high resistance in its common base connection. If the transistor is connected so that it appears in its common emitter configuration to direct currents and in its common base configuration to alternating currents, the effect is that of a resistive choke. However, its effectiveness is somewhat limited by slow operation, wave form mutilation and errors due to delay distortion.

It is therefore an object of this invention to provide an improved, two-terminal choke that has a low, D-C resistance and a high, A-C resistance.

It is a further object of this invention to provide a circuit, having a low static resistance and a high dynamic resistance, that is light in weight, noninductive, efficient and compact.

It is a further object of this invention to provide an improved, low-pass, filter circuit, adaptable to miniature, printed-circuit techniques and providing a minimum of delay and waveform distortion.

Figure 2:
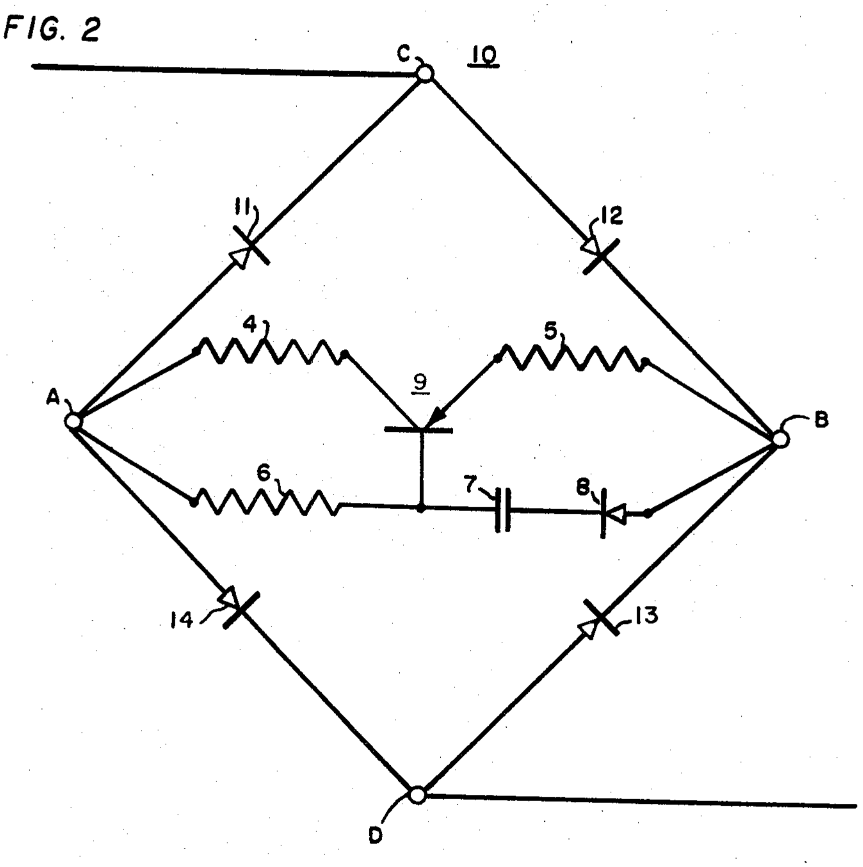

These and other objects of this invention will become apparent from the following description and the drawings of which:

FIGURE 1 shows the connection of the transistor and its associated elements between the two terminals of the network and FIGURE 2 shows a diode bridge circuit for coupling the circuit of FIGURE 1 into a two-way, two-terminal network.

Referring now to FIGURE 1 the two terminals A and B are connected to the network including the transistor 9; the resistors 4, 5, and 6; the condenser 7; and the diode 8. The resistor 4 is connected between the collector electrode of the transistor 9 and the terminals A, and the resistor 5 is connected between the emitter electrode of the transistor and the terminal B. The resistor 6 is connected between the base electrode and the terminal A, while the condenser 7 and the diode 8 are connected in series between the base electrode and the terminal B.

The two terminals A and B are connected to an external circuit that becomes the source of D-C potential.

FIGURE 2 shows a variation of this circuit for a use in a nonpolarized, two-terminal network. FIGURE 2 includes the diodes 11, 12, 13 and 14 connected in a bridge circuit with the terminals A and B and the transistor network of FIGURE 1 across one of the diagonals of the bridge and the two, nonpolarized-line terminals C and D across the other diagonal of the bridge.

In operation, with both the collector and the base electrodes connected, through resistors 4 and 5, respectively, to the same terminal of the source of potential, the connection of the emitter to the other terminal of the source of potential will put the transistor in the common emitter configuration, while the connection of the base electrode to the other terminal of the source of potential will put the transistor in the common base configuration.

In this case, the emitter is connected through the resistor 5 to the other terminal of the source of potential to provide a common emitter connection across the two-terminal network.

Since the capacitor acts as a very high impedance to direct current the transistor appears in it's low-resistance, common emitter configuration to the direct currents, which provides a low-resistance path to the flow of direct current. On the other hand the capacitor 7 through the diode 8 presents a comparatively low impedance to alternating current so the transistor appears in its high-resistance, common base configuration to the alternating currents, which provides a high resistance path to the flow of alternating currents. The D-C potentials across the terminals A-B see a low impedance network while the A-C potentials across the terminals A-B see a high impedance network.

The diode 8 is essential to the operation of this device for the transmission of square wave pulses of D-C. Since the capacitor 7, connected in the common base configuration, provides a low impedance for the leading edges and trailing edges of the square wave forms, the potential of the base electrodes is, first, drawn toward that of the emitter to produce an initial, high impedance until the capacitor charges and the potential of the base approaches that of the collector and the impedance drops. The low, forward resistance of the diode allows the capacitor to charge up on the first leading edge of voltage rise of the correct polarity but the high, reverse resistance of the diode holds the charge on the condenser and prevents it from discharging when the voltage drops. This maintains the potential on the base electrode near that of the collector, and keeps the transistor in a highly conducting state for any given sequence of D-C pulses, such as that of dialing pulses, in a telephone circuit.

While the direct current can flow from terminal B to A in accordance with the polarity of the transistor, it is obvious that the direct current cannot flow from terminal A to terminal B without meeting a different resistance in the transistor circuit and possibly damaging the transistor. With the direct current flowing in the proper direction through the circuit, AC may be superimposed on it without going beyond the normal range of operation of the transistor but even the AC must be kept within tolerable limits.

The circuit of FIGURE 2 is added to show how this limitation may be overcome. In FIGURE 2 the terminals C and D from the external line are connected across one pair of diagonals of a diode bridge and the terminals A and B of the network of FIGURE 1 are connected across the other pair of diagonals of the bridge. This maintains the flow of both alternating and direct current invariably from terminal B to terminal A of the network regardless of which direction the direct current may flow from the external circuit line to the terminals C and D.

The transistor shown in FIGURES 1 and 2 is of the PNP variety for use with the current flowing from B to A. The diode 8, for use with this transistor, has its anode adjacent to the terminal B and its cathode directed to the base electrode of the transistor for the correct flow of current to this transistor. The circuit may also be used with a NPN type of transistor which will then accept the flow of current from A to B. In this case the polarity of all diodes in both figures must also be reversed.

In a typical embodiment of the circuit as shown in FIGURE 2 the transistor 9 is a 2N1613. The resistances 4, 5 and 6 are 180 ohms, 150 ohms and 12,000 ohms, respectively. The capacitor 7 is 15 microfarrads and the diodes 8, 11, 12, 13, and 14 are 1N92's.

What is claimed is:

1. A two-terminal network comprising a transistor having an emitter electrode, a collector electrode, and a base electrode; a resistive means connecting said collector electrode to a first terminal; a resistive means connecting said base electrode to said first terminal; a resistive means connecting said emitter electrode to said second terminal; and a capacitor and a first diode connected in series between said base electrode and said second terminal; said first and second terminals comprising the terminals of said two-terminal network.

2. A network as in claim 1 having an additional 4 diodes connected in a bridge configuration with one diagonal of said bridge connected to said first and second terminals and the other diagonal of said bridge comprising the terminals of said two-terminal network.

3. A network as in claim 1, wherein said transistor is of a PNP variety and said first diode has an anode connected to said second terminal and a cathode connected to one terminal of said capacitor.

4. A network as in claim 3 having a second diode with its anode connected to said first terminal and its cathode connected to a third terminal; a third diode with its anode connected to said third terminal and its cathode connected to said second terminal; a fourth diode with its cathode connected to said second terminal and its anode connected to a fourth terminal; and a fifth diode with its cathode connected to said fourth terminal and its anode connected to said first terminal; said third and fourth terminals comprising the terminals of said two-terminal network.

References Cited

UNITED STATES PATENTS

| | | | |
|---|---|---|---|
| 2,892,164 | 6/1959 | Woll | 333—80 |
| 2,973,439 | 2/1961 | Wright | 307—295 |
| 2,995,697 | 8/1961 | Grenier | 323—22 |
| 3,251,951 | 5/1966 | Meewezen | 323—22 X |

JOHN S. HEYMAN, *Primary Examiner.*

U.S. Cl. X.R.

307—257, 259, 295; 333—80